UNITED STATES PATENT OFFICE.

JOHN D. BAYLIS, OF PHILADELPHIA, PENNSYLVANIA.

COMPOSITION FOR PRINTERS' INKING-ROLLERS.

SPECIFICATION forming part of Letters Patent No. 396,387, dated January 22, 1889.

Application filed April 6, 1888. Serial No. 269,854. (No specimens.)

*To all whom it may concern:*

Be it known that I, JOHN D. BAYLIS, a citizen of the United States, residing at Philadelphia, county of Philadelphia, State of Pennsylvania, have invented certain new and useful Improvements in Composition of Matter for Printers' Inking-Rollers, of which the following is a specification.

This invention relates, generally, to the manufacture of ink-rollers for printing-presses and the like, and particularly to a composition consisting of certain ingredients that is adapted to be made into a roll form, and when set to be employed as a means for distributing ink.

The object of my invention, among other things, is to provide a composition of matter adapted to form ink-rollers for printers' use which will not be affected by damp and murky weather, and which will repel the injury to the roller by vermin attracted to the composition by some of the ingredients of which it is composed.

The improved composition consists, essentially, of the following ingredients, viz: Glue, glycerine, sugar, Venice turpentine, oil of tar or rosin-oil, and saltpeter, and are suitably soaked, heated, and mixed together in the manner hereinafter described. In practice these ingredients will be combined in the following proportions—viz., glue, ten pounds glycerine, fifteen pounds; sugar, four pounds; Venice turpentine, two ounces; oil of tar, one ounce; rosin-oil, thirty ounces, and saltpeter one and one-half ounce.

In making the composition the glue should first be cut into thin strips or pieces and placed in a receptacle filled with water and left until it becomes thoroughly soaked and pliable; it may then be taken out and left to stand for an hour, until the water which it has absorbed penetrates it thoroughly. When this has been effected, the soaked glue is then placed in a glue-pot (such as is commonly used, preferably consisting of two receptacles, one within the other, the inner one being surrounded with water) and placed over a fire and subjected to sufficient heat to melt or dissolve the glue. After the glue has been thus melted, the glycerine should be heated in a separate vessel to about 100° Fahrenheit, and after which about seven and one-half pounds, or one-half of the proportion above stated, added to the melted glue. The sugar (which should be in a pulverized condition and free from lumps) is then added to the melted glue. After the sugar has become thoroughly dissolved, the remainder of the glycerine should be added to the mixture, and also the Venice turpentine and the oil of tar. The mixture should then be allowed to boil for an hour or more before adding the saltpeter, which may then be added. After this the mixture should be allowed to cool until it reaches about the temperature of 100° Fahrenheit, whereupon the rosin-oil should be added slowly, stirring the mixture quickly at the same time to compel the rosin-oil to become thoroughly mixed with the mixture. When this has been done, the mixture may then be strained through a sieve or in any other suitable manner, and be then ready to be poured into the molds for the making of printers' rolls.

The use of the oil of tar is not essential, as substantially the same effect may be produced without it; but I find that it assists to some extent the rosin-oil to form an outer surface or covering for the roller, and the saltpeter makes the surface of the composition adhesive. The Venice turpentine I find gives body and strength to the composition and increases its toughness, and at the same time prevents its destruction by rats and other vermin, one of the great sources of trouble with compositions heretofore made.

It is not absolutely essential that the ingredients be used in precisely the proportions named; but those named I have found in practice most effective in producing a composition that will combine all the necessary qualities to enable the making of ink-rollers that will be as effective in dry weather as in damp and murky weather.

What I claim is—

1. The herein-described composition of matter for the making of printers' inking-rollers, the same consisting of a mixture of glue, glycerine, sugar, Venice turpentine, rosin-oil, and saltpeter, and in the proportions substantially as described.

2. The herein-described composition of matter for the making of printers' inking-rollers, the same consisting of a mixture of glue, glycerine, sugar, Venice turpentine, oil of tar, rosin-oil, and saltpeter, and in the proportions substantially as described.

In testimony whereof I have signed my name to this specification in the presence of two subscribing witnesses.

JOHN D. BAYLIS.

Witnesses:
JAMES O'TOOLE,
NATHAN C. LANE.